United States Patent
Hart et al.

[15] 3,652,902
[45] Mar. 28, 1972

[54] ELECTROCHEMICAL DOUBLE LAYER CAPACITOR

[72] Inventors: Burt E. Hart, Red Hook; Richard M. Peekema, Woodstock, both of N.Y.

[73] Assignee: International Business Machines Corporation, Armonk, N.Y.

[22] Filed: June 30, 1969

[21] Appl. No.: 837,600

[52] U.S. Cl. ............................................. 317/230, 317/258
[51] Int. Cl. ..................................................... H01g 9/04
[58] Field of Search ............................... 317/230, 231, 233

[56] References Cited

UNITED STATES PATENTS

| | | | |
|---|---|---|---|
| 2,299,667 | 10/1942 | Waterman | 317/230 |
| 2,444,914 | 7/1948 | Brennan | 317/230 |
| 2,580,399 | 1/1952 | Brennan | 317/230 |
| 2,800,616 | 7/1957 | Becker | 317/230 |
| 3,098,182 | 7/1963 | Burnham | 317/230 |
| 3,263,137 | 7/1966 | Naumann et al. | 317/230 |
| 3,288,641 | 11/1966 | Rightmire | 317/231 X |
| 3,443,997 | 5/1969 | Argue | 317/231 X |
| 3,536,963 | 10/1970 | Boas | 317/230 |

*Primary Examiner*—James D. Kallam
*Attorney*—Hanifin and Jancin and Melvyn D. Silver

[57] ABSTRACT

An electrolytic double layer capacitor having low series resistance, high capacitance, and low inductance characterized by activated carbon plates of very high true surface to geometric volume ratio separated by a highly porous inert spacer as thin as 0.0005 inch, impregnated with highly concentrated electrolytes such as KOH or $H_2SO_4$.

1 Claim, 3 Drawing Figures

PATENTED MAR 28 1972 3,652,902
FIG. 1
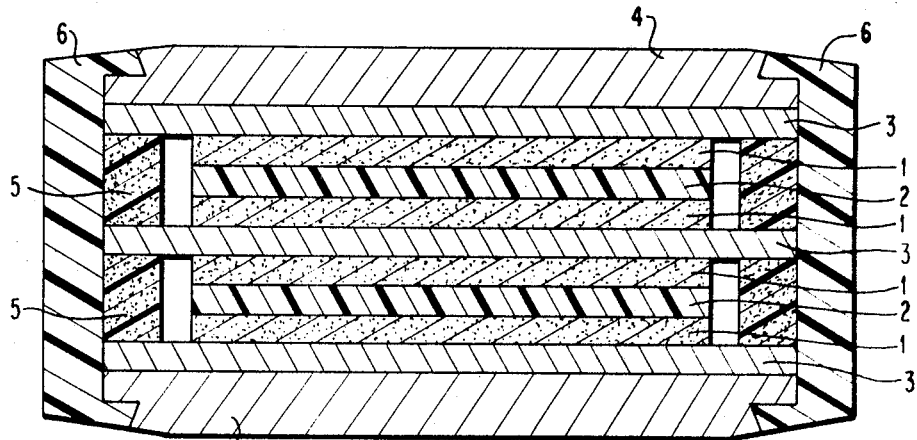
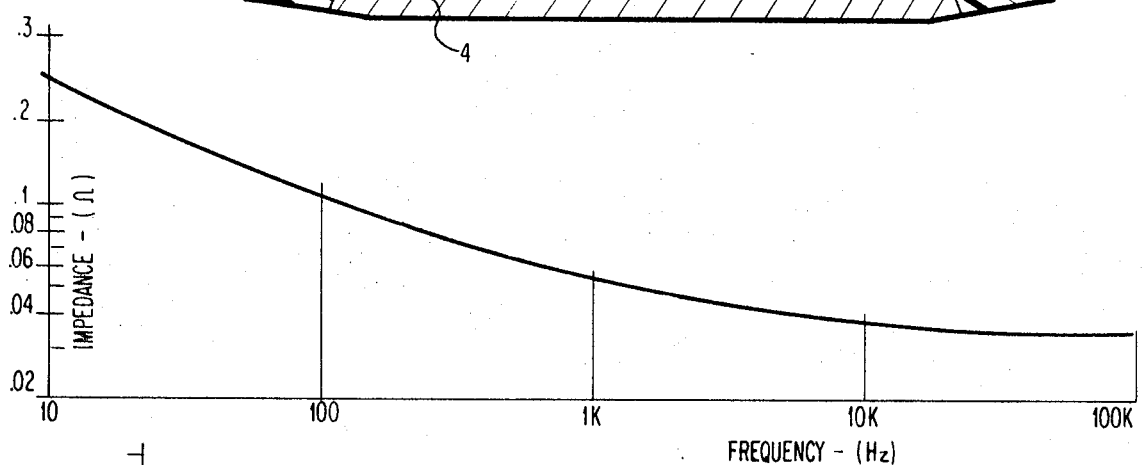
FIG. 2
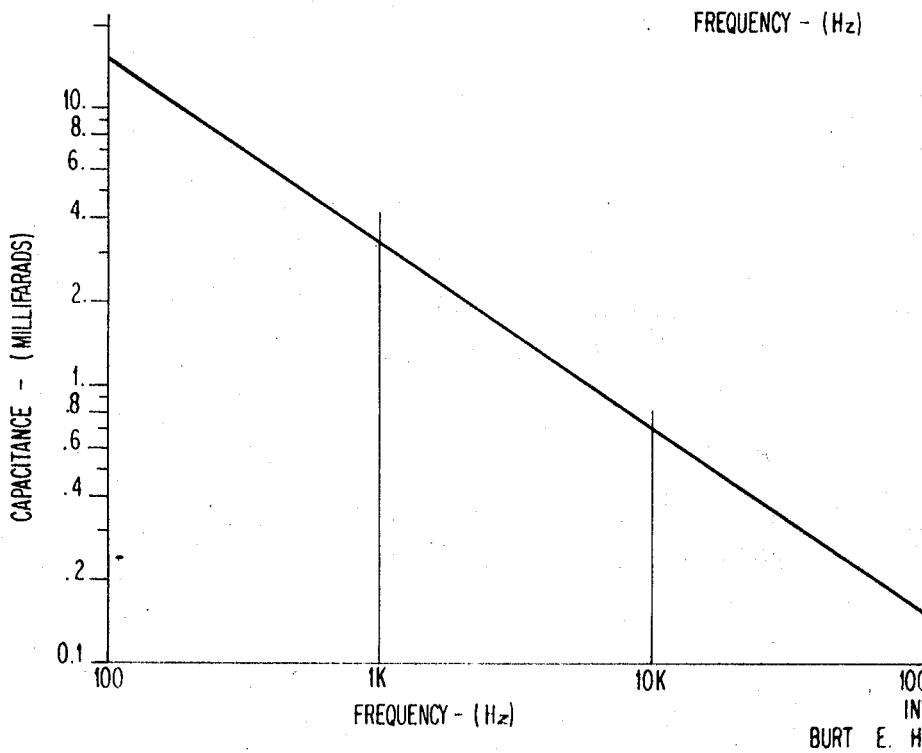
FIG. 3
INVENTORS
BURT E. HART
RICHARD M. PEEKEMA
BY Melvyn D Silver
AGENT

3,652,902

ELECTROCHEMICAL DOUBLE LAYER CAPACITOR

FIELD OF THE INVENTION

Electrolytic condensers having plural electrodes and an electrolyte, particularly having electrodes of the same material, being of a non-polar type.

BACKGROUND OF THE INVENTION

Capacitors of various types are known in the art and used for different purposes. The purpose for which a capacitor is used will determine the type of capacitor used. For example, one common distinction is to distinguish between polar capacitors and non-polar types. Non-polar types can be used with AC or DC current, while polar types are used with DC current. The typical polar capacitor such as an aluminum electrolytic type, having characteristics of one-third farad capacitance, working voltage of 6 volts, 10 milliohms equivalent series resistance (ESR) and with an inductance of approximately 100 nanohenries may average approximately 3 inches in diameter by 9 inches long in physical size. Thus, this type of capacitor has undesirable characteristics such as large bulk, a low capacity per unit volume, a series resistance that is often very high, and an inductance that is very high even under optimum circuit conditions. When aluminum electrolytic type non-polar capacitors are used, the capacitance per unit volume is lower still than with the polar type.

For many applications, such as for power supplies or load circuits, it is desirable that a capacitor have the properties of being non-polar while having a low series resistance, high capacitance, low inductance, and small bulk.

SUMMARY

Thus, it is an object of this invention to provide a high capacitance, low series resistance, low inductance capacitor of small size.

Another object is to allow such capacitors as above to be fabricated inexpensively.

These and other objects are met by the capacitor structure of this invention. This capacitor comprises in one illustration, two blocks of activated electrode material such as activated carbon or highly porous graphite material, exhibiting a very large true surface to geometric volume, at least one square meter per cubic centimeter, separated by a highly porous non-conductive material, of a thickness of approximately 5 mils, impregnated with a high conductivity electrolyte such as aqueous 30 percent $H_2SO_4$. This capacitance cell is connected via a non-porous electronic conductor, inert to the electrolyte, to exterior metallic conductors and/or to adjacent cells. Known potting compounds are used to provide the structural support and to seal the individual cells against leakage of electrolyte.

Utilizing the electrolytic double layer effect in this manner, a four cell capacitor approximately 1½ inches in diameter by one-fourth inch in thickness (overall) can provide, as an example, characteristics of 0.4 farad capacitance with a working voltage of 4 volts, an ESR of 35 milliohms, and DC leakage resistance greater than 10,000 ohms.

IN THE DRAWINGS

FIG. 1 is a cross-sectional view of a two cell, double layer capacitor made in accordance with this invention.

FIG. 2 is an impedance vs. frequency plot for a four cell capacitor made in accordance with this invention.

FIG. 3 is a capacitance vs. frequency plot for the capacitor of FIG. 2.

GENERAL DESCRIPTION

The electrical double layer effect is known in the art, and is discussed in such publications as "Electrochemical Kinetics" by Vetter, 1965, Academic Press, Inc., pages 73–103, and "Fast Charge Molten Salt Batteries," Proc. of 21st Annual Power Sources Conference, 1967, pages 42–45.

FIG. 1 shows a cross-section of a two cell, double layer capacitor in accordance with this invention. The vertical scale has been greatly enlarged to facilitate description of the device.

An activated carbon or highly porous graphite material 1, 5–40 mils in thickness in the preferred embodiment, is utilized as an electrode. This material exhibits a very large true surface to geometric volume. This is achieved by using activated carbon or highly porous graphite. Activated carbon is made by expanding the pores in the carbon to increase the true surface area of the material. The term "activated carbon" is well known in the art. For example, the book, Activated Carbon by J. W. Hassler, Chemical Publishing Co., New York, 1963, describes various methods of making activated carbon. The electrode material, whether activated carbon or highly porous graphite or other material, must be highly porous so as to expose a very great surface area. As a ratio of true surface area to volume, a minimum of 1 square meter/cubic centimeter is necessary for the desired improved capacity characteristic. Where DC or low frequency (e.g. 60Hz.) service is of primary interest, a working range of at least 20–500 square meters/cc. is preferred. The porosity, of course, must be interconnecting to permit electrolyte access, and the above ratio pertains to the working zone or layer of the electrode having such access. The electrode material must be inert to the electrolyte used, and must be a good conductor of electricity. The maximum thickness of this material is limited only by the allowable resistance and inductance that a designer can tolerate. The minimum thickness is dictated only by the fragility and working characteristics of the material, in producing a practical device.

Thus, the electrode material must have a high surface area, be highly porous, and be a conductive material. Such materials thus include highly porous nickel electrodes as made by sintering, and platinum black. These materials are given by way of illustration of the types of materials, and are not meant as limiting this invention solely to these materials. For clarity, these materials will all be defined as "activated electrode material," having the above properties.

Thus, an activated electrode material is one having a high surface/volume ratio at least 1 square meter per cubic centimeter, of interconnecting porosity, and be an electrically conductive material, while being essentially inert to the electrolyte used in conjunction with the electrode.

Located between the activated electrode material 1 is a highly porous non-conductor 2 impregnated with a high conductivity electrolyte such as a 30 percent solution of $H_2SO_4$ or a 25 percent solution of KOH in water, in the preferred embodiment. Aqueous electrolytes have, in general, higher conductivity but a lower decomposition potential than nonaqueous electrolytes. In most cases, an aqueous electrolyte is preferred because of the lower resulting series resistance. The desired voltage rating can be achieved by employing a plurality of cells in series.

The non-conductor material 2 functions both as an electrolyte holder and as an electrode separator and is one of the materials which significantly influences the equivalent series resistance (ESR) of the capacitor. This material is thin, preferably 0.5–10 mils, highly porous (greater than 50 percent open spaces), and readily wet by the electrolyte. In essence, this material is as thin as possible while still preventing contact between the adjacent activated electrodes. The greater the spacing, the greater is the electrolyte contribution to resistance.

While most capacitors made in accordance with this invention will have such a spacer, as a practical manufacturing expedient, it will be clear that what is needed is a space between the electrodes to prevent electrical shorting, and not a spacer per se. Thus, if the electrodes are mounted in a spaced relation to each other by some mounting means, no spacer as such is needed.

Materials that are utilized include filter paper as is commonly found in most laboratories, cellulose fiber papers, tissue papers, nylon mesh for basic solutions, or porous plastics, polyimide, epoxy glass, glass cloths, or any material that is highly absorbent (readily wet), and that will maintain the separation between the electrode plates. The material is as porous as possible so as to reduce resistance as much as possible. Thus, insulating meshes or mattings are also allowable.

Care should be taken that the non-conductor is sufficiently absorbent or wettable so as to avoid voids or bubbles being trapped therein, which prevent the maximum amount of electrolyte being utilized and increases resistance.

A non-porous electronic conductor element 3, which is inert and non-film forming in the selected electrolyte, is adjacent the carbon blocks. This material prevents electrolytic conduction between cells, and also prevents galvanic corrosion of the metallic end pieces 4. A preferred choice is gold, plated upon a metallic conductor such as copper. A number of choices for this material are available, including gold, platinum, base materials plated with gold or platinum, pyrolytic graphite, vitreous carbon, or wax or resin impregnated graphite or carbon. Elements 3 could be combined physically with electrode elements 1 by utilizing a composite structure made from, for example, selectively impregnated carbon. It is important that whichever material is chosen, it should neither react with the electrolyte, nor allow an oxide or other insulating film to form between the electronic conductor 3 and the carbon blocks 1.

The metallic conductor 4, such as copper in the preferred embodiment, is used to provide both structural strength for and electrical contact to the capacitor. If desired, the external form of these end pieces may be modified to provide a more conventional connection such as a pigtail connection, as with other types of capacitors. However, the configuration shown is designed to reduce the overall inductance of the package by maximizing the reluctance of the magnetic path around the device. For this reason, the overall package is disk shaped, that is, thin with respect to its lateral dimension, and circular in outline, and has large, flat contact surfaces.

An insulating inert gasketing material 5, such as Teflon or polyethylene, which is bonded to the electronic conductor, is utilized in the preferred embodiment. The bonding agent is, of course, resistant to the electrolyte. This material is as thick as is necessary, depending upon the thicknesses of layers 1 and 2, and serves as a first line of defense against leakage of the electrolyte.

A potting or encapsulating material 6, such as an epoxy resin, provides a secondary means of holding the capacitor together. This material also serves as a second line of defense against leakage of the electrolytes. This material is at least moderately resistant to attack by the electrolyte, and does not fracture easily.

The overall dimensions for a typical capacitor of this construction are approximately one-fourth inch thick by ¼ inch in diameter.

A preferred method of assembly of this capacitor is as follows. Prior to assembly of the capacitor, the electrode material is thoroughly impregnated with electrolyte. Vacuum impregnation is preferred, but is not essential in all cases. It will, however, insure the maximum contact possible between electrolyte and electrode, and is to be desired. Before impregnation, the electrolyte may be deaerated by bubbling purified nitrogen gas through it. The capacitor is then assembled in a nitrogen atmosphere.

The electrical connection between layers 3 and 4 in FIG. 1 is a potential trouble spot, as maximum conductivity is desired. If the electronic conductor 3 is wax impregnated graphite, some conductive adhesive may be needed to reduce the resistance between the conductor 3 and the metallic conductor 4. Other approaches which obviate this problem are to use gold as the non-porous barrier, and electroplate it directly onto copper end pieces 4, as in the preferred embodiment. If pyrolytic graphite is used, this can also be deposited directly onto the metallic end piece. In any event, sound electrical connection must be assured between the layers 3 and 4.

The activated electrode material is the key material in providing the capacitive properties of the double-layer capacitor. For example, most conductors exhibit a double-layer capacitance of 20–50 microfarads/cm.$^2$ when placed in an electrolytic solution, and carbon, for example, is no exception. When this property is combined with the huge surface area of activated carbon (which may be as great as 1,000 square meters per cc.), the result is as shown in examples below. The primary problem is getting the activated carbon in the desired physical form to build the capacitor. Among the solutions to this problem are the four discussed below.

One may first fabricate a solid carbon material into the desired shape, and then activate it. Alternatively, one may take activated carbon powder or granules and design the cell to utilize them directly. Or, one may utilize commercially available sheets of filter media which contain high percentages of activated carbon. Or, one may start with activated carbon powder and a suitable binder, and press into the desired shape.

EXAMPLE 1

Two blocks of carbon one-half inch thick, cut from a 2 inch diameter carbon electrode, were separated by a single sheet of facial tissue paper soaked in a saturated solution of table salt. This arrangement gave a DC capacitance of 300,000 microfarads, an ESR of 15 milliohms, and a leakage resistance of 100 ohms at 1.1 volts.

EXAMPLE 2

A petroleum coke base carbon was fabricated into wafers 1 inch in diameter and 0.020 inch thick and then activated by heating in air at 500° C. for several hours, until a surface to volume ratio of 50 sq. meters/cc. was generated. Utilizing aqueous 30 percent $H_2SO_4$ electrolyte and a microporous plastic separator, a two-cell capacitor was made having the following properties: DC capacitance 1.4 farads, ESR 58 milliohms, working voltage 3 volts, and DC leakage resistance of 1,000 ohms.

EXAMPLE 3

Activated carbon, as in Example 2 above, 0.010 inch thick, four cells in series, high frequency ESR (see FIG. 2) 0.035 ohm, DC capacitance 0.4 farad, inductance <0.2 nh., working voltage 4.0 volts, AC ripple current, max. 4 amp (est.), leakage current at rated v. <0.5 ma., and dimensions of 1.5 inch in diameter by 0.27 inch or 0.48 cu. in. The AC performance characteristics are shown in FIGS. 2 and 3.

EXAMPLE 4

Activated carbon — FC–13 Fuel Cell electrodes from Pure Carbon Co., St. Marys, Pennsylvania, 1.00 inch in diameter by 0.10 inch thick, having a surface to volume ratio of 400 sq. meters/cc., 30 percent $H_2SO_4$ aqueous electrolyte, microporous plastic separator, DC capacitance 40 farads, ESR 100 milliohms, and voltage 1 volt.

In summary then, in these capacitors, a thin layer of highly conductive electrolyte is sandwiched between two identical electrodes of an activated electrode material having a very large ratio of true surface to geometric volume. The electrode area and separation are selected to give the desired equivalent series resistance, and the true surface area of the electrode will determine the value of capacitance. For example, smooth platinum exhibits approximately 20 microfarads/cm.$^2$ double layer capacitance, while platinum black has been measured at approximately 100,000 microfarads/cm.$^2$. The AC characteristics shown in FIGS. 2 and 3 suggest that the participation of the more inaccessable areas of the electrode surface is frequency dependent. Thus, although electrode materials having very high surface/volume ratios (e.g. at least 20–500 square meters/cc.) are preferred for DC or power frequency service, materials exhibiting higher conductivity at the cost of lower (but still substantial) surface/volume ratios may be optimum for high frequency service.

The charge-voltage characteristic of the symmetrical electrochemical cells are essentially linear up to the decomposition voltage of the electrolyte, which will be about 1¼ volts, for preferred aqueous electrolytes. To achieve higher working voltages, several cells are put in series, at some expense of capacitance and ESR. The preferred disk-shaped construction of the individual cells and the overall package, and particularly the use of the axially compact and laterally extensive disk 3 connection between cells, enables multiplication of the number of cells while avoiding prohibitive inductance problems. Thus, the preferred electrolytic conductor is a solution of low resistivity such as 30 percent $H_2SO_4$ or 25 percent KOH in water, as stable as possible to avoid thermal and electrochemical decomposition. Nonaqueous solvents could be selected to give a greater decomposition voltage rating per cell, but such electrolytic conductors in general have a higher resitivity than their aqueous counterpart. Also, solid electrolytes could be used to eliminate liquids entirely. For example, $RbAg_4I_5$ and $KAg_4I_5$ as such electrolytes, exhibit high electrolytic type conductivity and ionic mobility. Solid electrolyte use might reduce or eliminate gas problems. In each case, the electrode is a chemically inert solid of large surface area such as carbon or platinum, and is wet by or is in intimate association with the electrolyte.

The separation between electrodes is maintained by a thin plastic gasket, or by a thin porous separator of paper or plastic which is not attacked by the electrolyte, or by some other suitable means. The completed device may be composed of a number of cells in series formed by alternating layers of electrodes and electrolytes, with the electrolyte in each cell essentially separated from that in all other cells. The completed device may be sealed with or without a safety vent, the latter being possible in some cases because of the small amount of liquid present in each cell. As an additional feature, one could add a third electrode to each cell to provide for a catalytic recombination of gases released during an over voltage condition, as is done in sealed secondary batteries.

While specific examples have been shown, and specific materials illustrated, others skilled in the art will realize that other materials may be substituted therefore while still maintaining the scope and content of this invention.

What is claimed is:

1. A low inductance electrolytic double layer capacitor comprising
   at least one cell comprising at least first and second thin, disc-form electrode structures,
   spacing means for maintaining said electrode structures in spaced relation to each other,
   each of said electrode structures comprising
   an electrode portion of the same activated material presenting on one side a porous generally planar space contiguously to the space between said electrode structures,
   each said structure further comprising a planar electrolyte impervious conductor portion substantially coextensive with and in electronic communication with said activated portion at the other side thereof,
   said activated portions and said space being saturated with a dry ionically high conductive solid electrolyte, said electrode structures and said means for maintaining the same in spaced relation being inert to said electrolyte,
   said electrolyte being a solid ionic conductor consisting of silver iodide containing an alkaline metal, said electrolyte being chosen from the group consisting of $RbAg_4I_5$ and $KAg_4I_5$,
   and an axially short outer package comprising conductive, disc-shaped end terminals parallel to and in electrical communication with said conductor portions and substantially coextensive therewith,
   said cell being connected in series between said terminals by said electrolyte impervious portions, providing non-film forming isolation of the electrolyte to the cell and electrical communication to said terminals,
   said impervious conductor portions comprising portions of said electrode structures which are selectively sealed so as to be devoid of said electrolyte.

* * * * *